July 25, 1939.    F. ASSMUS    2,167,060
COLORIMETER
Filed Dec. 1, 1936
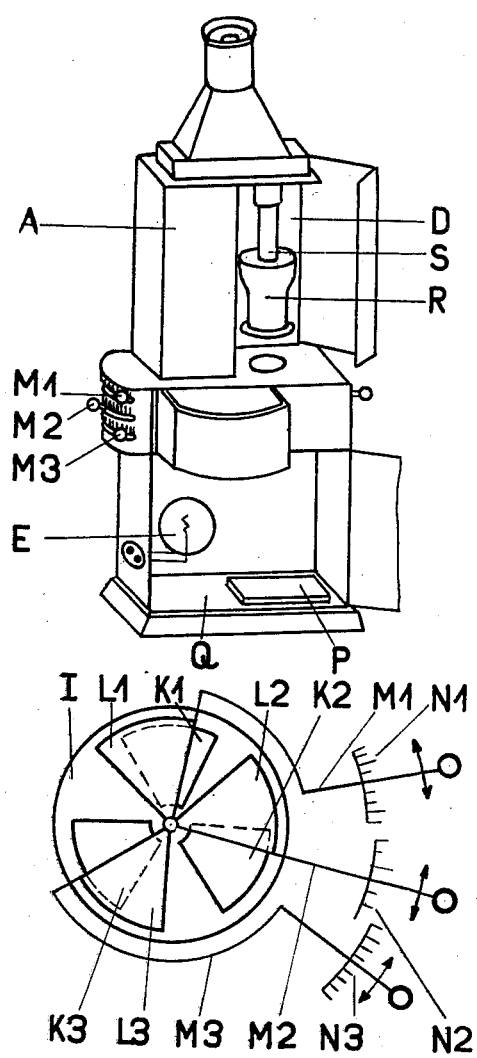
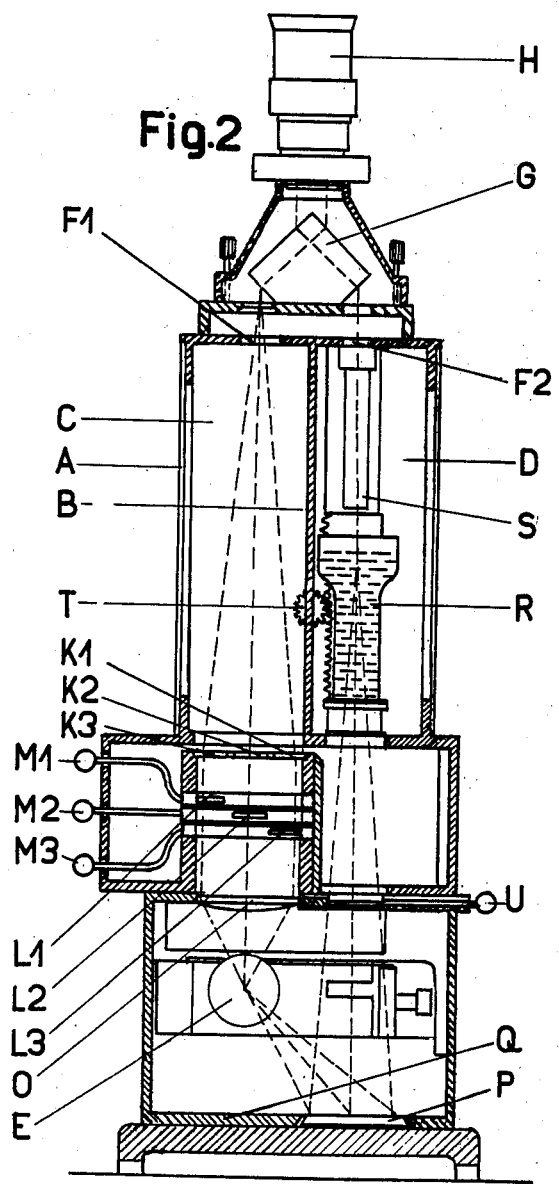

Patented July 25, 1939

2,167,060

UNITED STATES PATENT OFFICE 2,167,060

COLORIMETER

Friedrich Assmus, Freiburg, Breisgau, Germany, assignor to F. Hellige & Co., Freiburg, Breisgau, Germany Application December 1, 1936, Serial No. 113,635
In Germany January 2, 1936

1 Claim. (Cl. 88—14)

The invention refers to a colorimeter, i. e. an optical apparatus for composing additively and/or decomposing any color or color solution into its fundamental color parts by means of the trichromatic color-procedure. This can be accomplished by optical comparison of two color fields, one of these fields representing the color under test, that is the color to be colorimetrically determined, whilst the other is artificially produced by means of a color filter, composed of the three fundamental colors red, green and blue, which may be adjusted to any color value required.

The apparatus can be applied in different ways. It can be used, for example, to analyse any color or color solution as to the amount of each of the three fundamental colors of which it is composed. This may be done by adjusting exactly the field of observation of the color-forming system, consisting of color filter and diaphragm devices with the color value of the color to be determined. If now one diaphragm with a scale is provided for each color range of the filter, the amount of each of the fundamental colors composing the color value to be determined can immediately be read off from the three scales of the diaphragms of the color filter, as soon as the colors of the observed color fields correspond. Thus the color value as regards color shade and color depth of any solid, non-translucid substance, of any transparent substance and any color solution can be fixed; in the latter case the color depth revealing a certain concentration of the solution, will very often be of special importance.

The apparatus according to the invention enables besides the above described decomposition of color values, any desired color to be composed according to the tone and depth of color. This is done by adjusting the scales of the three diaphragms of the color filter arrangement to previously determined values, corresponding to the color sought for. The color or color solution to be determined must now be altered until its color value in the field of observation exactly corresponds to the color artificially produced by the color filter, according to the adjustment of the diaphragms. By gauging of the position of the filter diaphragms, any desired color solution or color can thus be standardized and can easily be reproduced at any time by means of the apparatus in question, by a corresponding adjustment of the filter diaphragms.

The object of the invention is to create for the above purpose, a new, relatively low-priced apparatus of very simple construction.

Another object of the invention is to construct this apparatus so that it can be easily handled and allows of carrying out by similar performances quite a number of different determinations without the accuracy of the measurements being affected.

Another feature of the invention is the special manner of guiding the rays in the new apparatus and the special arrangement of the light channels, when only one single light source is employed.

Other particulars, being further details of the invention, are explained in the example given below for better understanding.

The principal parts of the device are the following: a color filter arrangement formed of the three fundamental colors green, red and blue, in combination with a diaphragm device consisting of three separate diaphragms, each single diaphragm belonging to one of the three color ranges of the filter and being adjustable independently of the other diaphragms, each of the diaphragms being provided with a lever for adjustment connected with an adjusting scale, a light source in front of this color filter arrangement and a light channel behind this filter arrangement, forming the mixing chamber for the filter light, this channel being shut off by a frosted observation window, which will light up in the color produced in an optical additive way by the exposed parts of the filters representing the three fundamental colors, these parts adapted to be adjusted at will by means of the diaphragms, a second light channel, likewise shut off by an observation window and containing the color medium to be determined.

The apparatus according to the invention is illustrated by way of example in the accompanying drawing in which Fig. 1 shows the apparatus in elevation.

Fig. 2 is a longitudinal section through the apparatus on a slightly larger scale with the light ray paths indicated diagrammatically.

Fig. 3 shows in part elevation the three color filter-arrangements with the filter diaphragms to be separately adjusted.

A is the outside casing, divided by the partition B into two parallel light channels C and D, illuminated by the common light source E, the path of the rays being shown in dash lines. The left-hand light channel C comprises a system of color filters allowing the artificial composition of any color value. The natural color medium to be colorimetrically determined, is arranged in the right-hand light channel D. The two light channels C and D are shut off by frosted windows $F_1$ and $F_2$ which supply the observation of the color values of the two light channels to be compared and the color fields are optically directly juxtaposed by means of a prism G and the eye-piece H to facilitate the comparison.

The color forming system at the entrance of the light channel C is composed of three color glasses or translucent color filters $K_1$, $K_2$ and $K_3$ fixed in a disc I and having the narrowest possible spectral range in red, green and blue. As shown in Fig. 3, these filters may be sectors which are so arranged that they form a circle. Diaphragm sliders $L_1$, $L_2$ and $L_3$ of similar sector shape are coordinated to the color ranges $K_1$, $K_2$ and $K_3$ of the filter. Each of these sliders has an adjusting lever $M_1$, $M_2$, $M_3$ respectively and can be adjusted separately and independently of the other sliders, so that each color range can be screened as desired. By the filter and diaphragm arrangement described and shown, any possible color value can be adjusted as desired as every color has to be additively built up from the three fundamental colors red, green and blue, when these different colors are mixed with each other in the correct proportion.

The diaphragm sliders $L_1$, $L_2$, $L_3$ are concentrically journalled (Fig. 3). The adjusting levers $M_1$, $M_2$ and $M_3$ are preferably superposed and project from the side of the casing, a separate adjusting scale $N_1$, $N_2$, $N_3$ respectively being provided for each of the levers, and indicates directly the extent of screening of the corresponding color filter glass and thereby determines the proportion of the fundamental color in question contained in the colorimetrically determined comparison color. On the other hand, any desired color can be subsequently recomposed by means of the adjusting scales $N_1$, $N_2$ and $N_3$ when the three scale values of the diaphragms are known or have been once ascertained. It will thus be possible by gauging the adjustment of the scales $N_1$, $N_2$, $N_3$ to reproduce very easily and simply any certain color values or color solutions with greatest accuracy at any time, without keeping a stock of expensive standard color values.

According to the example illustrated the uniformly spaced color filter sectors $K_1$, $K_2$ and $K_3$, possess a maximum angle of 60°, so that the diaphragm sliders $L_1$, $L_2$, $L_3$, even when wide open, do not cover the adjacent filter. The arrangement and construction of the color filters and of the diaphragm device as described is of special advantage, not only in a constructive respect but also, owing to the central arrangement of all the parts, as regards the thorough and uniform mixture of the filter light. In order to come to a homogeneous mixture of light of the three filters $K_1$, $K_2$, $K_3$, a frosted pane or a milk glass can be inserted between the filter system and the light source E, or the filter glasses themselves are frosted. In order to condense the light beam, a condenser lens O can be interpolated between filter and light source, the plane surface of the lens facing the filter being frosted. The light channel c behind the filter arrangement acts as mixing chamber for the filter light. The additively mixed color produced by means of the arrangement of the filters, will appear on the observation window $F_1$ which consists of one or preferably several superposed frosted or milk glass panes. By the multiple arrangement of the frosted panes in the window $F_1$, the uniformity of the adjusted color value is still enhanced by a more intense mixing of the light. The distance between the observation window $F_1$ and the color filter as well as the central disposition of all parts including the light source E, are important factors for the superior quality of the light mixture.

The light emanating from the common light source E, which lies in a central position relatively to the light channel C must pass through the color medium to be color-metered, and it is directed into the light channel D after being reflected by the totally or partly frosted reflecting screen P of mirror- or milk glass, provided at the rear wall Q of the casing, in a central and vertical direction to the light channel D. In this channel the light passes through the color medium to be tested, which, according to Fig. 2, consists of a color solution contained in a trough R in which the height of the solution can be varied, that is an arrangement similar to the well-known Dubosq apparatus for the simple determination of concentration of solutions. S is the glass plunger of this apparatus. By raising or lowering the trough R by means of the adjusting device T, the liquid depth which represents the measure for the concentration of the color solution, can be regulated. By means of this arrangement it is possible to compose immediately, in the simplest way, color solutions of a certain concentration after corresponding preliminary gauging of the filter scales $N_1$, $N_2$ and $N_3$, without previous, often cumbersome preparation of a normal solution.

A diaphragm device U of any suitable construction, provided at the entrance to the light channel D, will allow, if necessary, a compensation of the degree of luminosity of the illumination by lateral delimitation of the rays. The color value of the color medium under test, which may be not only a color solution but just as well another transparent or even a solid body (vide below), will appear in the window $F_2$ and is then compared with the additively produced color of the field of observation $F_1$ by means of the prism G and of the eye-piece H.

If the purpose of measuring to be carried out is to decompose into its constituent color parts a color to be tested, then the color value of field $F_2$ is constant and the filter system must be adjusted so that its color field $F_1$ exactly corresponds with the color value $F_2$. The positions of the diaphragms to be read off from the scales $N_1$, $N_2$, $N_3$, will show the amounts of the fundamental colors present in the color under test. Should, however, a certain color have to be reproduced, then the diaphragm sliders $L_1$, $L_2$, $L_3$ will first have to be adjusted to the scale values corresponding to this color, these values having for instance been ascertained by previous measurements or supplied with the instrument as gauged values. Then the color or color solution to be prepared is inserted into the light channel D and altered until the fields of observation $F_1$ and $F_2$ again show a uniform color. As soon as this is attained, the desired color value is exactly reproduced.

If, finally, instead of a color solution or other transparent colors, the surface color of a solid opaque body is to be determined by means of the new apparatus this opaque body to be tested is substituted for the reflecting screen P (Fig. 2). In this case, only the rays reflected by this body supply the color image of the field of observation $F_2$, because there is no other color medium in the light channel D. As for the rest, the measuring procedure remains the same as described above.

I claim:

A colorimeter comprising in combination a casing, a partition subdividing said casing into a light-mixing compartment and a test compartment arranged in parallel relation, two screens of translucent material at one end of said casing, one screen coaxial to each of said compartments, a plano-convex lens at the other end of said mixing compartment, a source of light arranged in the axis of said mixing compartment on the side of said lens remote from said screen, a filter arranged in said mixing compartment between said lens and said screen and comprising three sector-shaped filtering members arranged in a circle in equidistant relation and colored respectively in one of the three primary colors, three rotary diaphragms arranged in said mixing compartment between said filter and said lens, each diaphragm shiftable within the range of one of said filter members, a handle projecting radially from the periphery of each of said diaphragms, the three handles arranged in superposed relation and each adapted to turn the corresponding diaphragm about the axis of said mixing compartment to vary the exposed area of and consequently the passage of light through its associated filter member, scales one in the range of movement of each of said handles to indicate the positions of each of the diaphragms, means in the test compartment for supporting the object to be tested, a reflector arranged in the axis of said test compartment outside the end remote from the translucent screen and adapted to reflect light rays from said source of light on to the object in said testing compartment, an ocular arranged on said casing in a plane intermediate said screens and on the outer side thereof; and optical means for deflecting into said ocular in optical juxtaposition the light projected through the two screens.

FRIEDRICH ASSMUS.